May 14, 1935. A. A. WIEDMAIER 2,001,337
TRANSMISSION OPERATING AND CONTROLLING APPARATUS
Filed Oct. 23, 1931
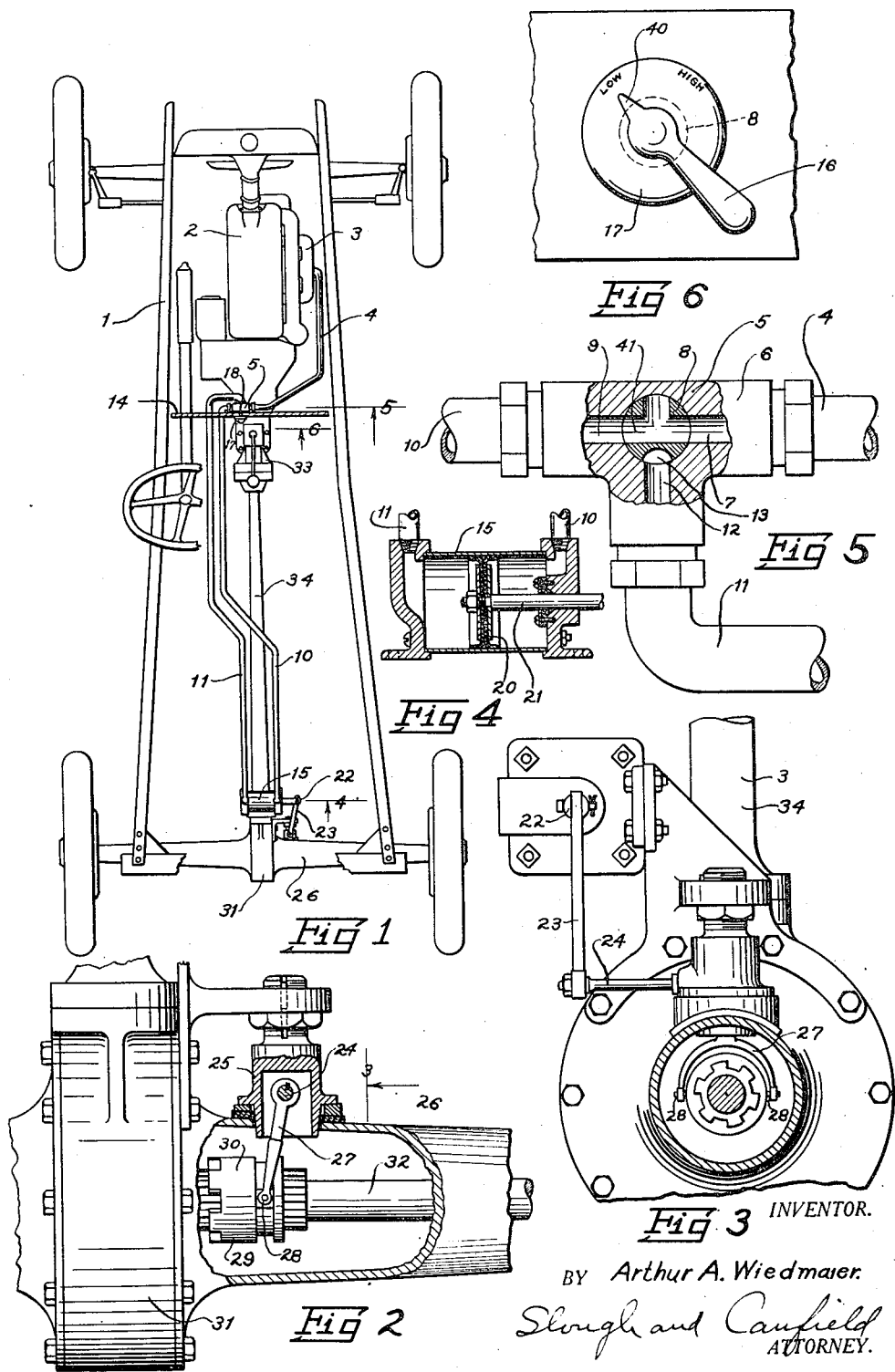
INVENTOR.
BY Arthur A. Wiedmaier.
Slough and Canfield
ATTORNEY.

Patented May 14, 1935

2,001,337

UNITED STATES PATENT OFFICE 2,001,337

TRANSMISSION OPERATING AND CONTROLLING APPARATUS

Arthur A. Wiedmaier, Detroit, Mich.

Application October 23, 1931, Serial No. 570,748

10 Claims. (Cl. 74—364)

This invention relates to apparatus adapted to be driven by internal combustion engines and relates more particularly to means for effecting changes in the power transmission mechanisms thereof.

My invention is susceptible of numerous varied applications but I have chosen to show and describe it herein as applied to a changing of speed ratios in the transmission gearing of automotive vehicles.

It is one of the objects of my invention to provide an improved apparatus and mode of operation for shifting transmission gears employed with internal combustion engines.

Another object is to provide an improved apparatus and mode of operation for shifting transmission gears of automotive vehicles.

Another object is to provide an improved apparatus and mode of operation for shifting transmission gears with particular application to shifting mechanism involving a movement back and forth between two positions.

Another object is to provide an improved means for shifting the two speed gears of rear axle automotive vehicle transmission.

Another object is to provide an improved means and method for applying the vacuum at the intake side of an internal combustion engine to the operation of movable mechanisms generally; for example, to the operation of the gear shifting mechanisms of power transmissions of the engine.

Another object is to provide an engine vacuum operated gear shifting mechanism for automotive vehicles and dash control for the same.

Other objects will be apparent to those skilled in the art to which my invention appertains.

My invention is fully disclosed in the following description taken in connection with the accompanying drawing in which:

Fig. 1 is a top plan view of the chassis of an automotive vehicle with parts removed for simplicity and showing a mechanism embodying my invention;

Fig. 2 is a view of a part of the rear axle of the vehicle of Fig. 1, and with parts broken away to illustrate the mechanism, and drawn to a larger scale;

Fig. 3 is a view taken approximately from the plane 3 of Fig. 2;

Fig. 4 is a view to an enlarged scale taken approximately from the plane 4 of Fig. 1;

Fig. 5 is a view to an enlarged scale taken approximately from the plane 5 of Fig. 1, the view being fragmentary and illustrating a valve mechanism which I may employ; and Fig. 6 is a view taken approximately from the plane 6 of Fig. 1, and illustrating a dash board control device which I may employ.

Referring to the drawing I have shown at 1, generally, the chassis of an automotive vehicle, at 2 an internal combustion engine thereon, having an intake manifold 3. Communicating with the intake manifold is a vacuum pipe or pipeline 4, extending from the manifold to a valve device illustrated generally at 5 and shown separately in Fig. 5.

The pipe 4 is threaded into or otherwise secured to a head 6 having a passageway 7 communicating with a rotary valve element 8 in the head. The head also has a passageway 9 communicating with the valve element and also communicating with another pipe 10 secured to the head 6. A third pipe 11 secured to the head communicates with the passageway 12 in the head which in turn communicates with the valve element 8. The passageways 7 and 9 are preferably axially aligned and are at right angles to the passageway 12, and the rotary valve element 8 is preferably of the plug type having a T-shaped passageway therein, and having also an exhaust port 13 communicating with the atmosphere.

Such valve heads and rotary valve elements are well known and a more detailed description thereof is believed to be unnecessary. The operation of the device 5 will appear later. The pipes 10 and 11 extend from the valve device 5, which latter is preferably mounted on the forward side of the usual dash-board 14, rearwardly of the chassis and communicates with the interior of a cylinder 15, Figs. 1 and 4, being screw threaded or otherwise secured to the opposite ends thereof.

The rotary valve element 8 may be turned by a lever 16 connected thereto in any suitable manner or as illustrated in Figs. 1 and 6. The lever 16 may have secured thereto an indicating head 17 having thereon suitable indicia, for a purpose to be described, such as "low" and "high". The head 17 and lever 16 may be disposed on the rearward side of the dash 14 in view of the operator, and a suitable connection or shaft 18 may extend through the dash to connect the element 8 and the head 17, as will be understood.

In the cylinder 15 is a piston 20 adapted to be reciprocated therein and having a piston rod 21 extending through one end wall of the cylinder and suitably packed to seal it therein in any suitable or well known manner.

The end of the piston rod 21 is connected pivotally as at 22 to a lever 23 connected to a rocker shaft 24 rotatably mounted in a housing 25, which is secured to and communicates with the interior of the rear axle housing 26 of the vehicle. Interiorly of the housing 25, the shaft 24 is connected to a swinging fork 27 terminating at the ends of the fork in suitable pins or rollers 28, extending inwardly radially into a groove 29 on a clutch element 30 associated with the rear axle driving mechanism.

The housing 25 is provided with a tubular portion adapted to be telescoped into an aperture formed in the wall of the axle housing 26, and is supported in place by means of a bracket which is held by the bolts which secure the differential housing sections together, and which bracket also supports a cylinder 15. As shown in the drawing, the forward end of the housing 25 is threaded and a nut fitted thereon engages the bracket to firmly press the housing 25 into engagement with the axle housing 26, so as to prevent the escape of grease from the axle housing.

The rear axle housing 26 comprises differential housing 31 in which is housed a gear mechanism preferably comprising the usual differential mechanism with which is additionally associated a two-speed transmission gear mechanism, such for example, as that shown and described in my Patent No. 1,815,689, dated July 21, 1931. The said patented mechanism comprises a clutch element corresponding to the element 30 and the mechanism of the said patent may be considered enclosed within the rear axle housing 26 and the differential housing 31, although not illustrated in the drawing of the instant application for purposes of simplicity. It will be understood, however, that when the clutch element is moved axially of the rear axle, by means of the shifting fork 27, it will change the gear ratio at which the rear axle, a part of which is shown at 32, is driven from the engine 2. In this connection also, I have shown at 33, Fig. 1, a housing containing connections with the engine, and at 34 a tubular housing containing a propeller shaft of usual or suitable construction whereby power from the engine is transmitted to the differential and two-speed gear mechanism in the combined housing 26—31 referred to.

It will further be understood, in connection with said patent, that upon movement of the fork 27 to the left, as viewed in Fig. 2, the speed ratio will be decreased, that is to say, the rear axle 32 will be driven at a relatively low speed and upon corresponding movement to the right, the speed ratio will be increased and the shaft 32 will be driven at a high speed.

In the operation of my invention, it will be understood that when the engine 2 is in operation the clutch element 30, Fig. 2, will be, in the position illustrated whereat the rear axle 32 and therefore the vehicle will be driven forwardly at the corresponding relatively low speed. The operation of the engine creates at all times a vacuum or partial vacuum in the manifold 3 and pipe 4. The lever 16, Fig. 6, being in the position shown, and by means of the index finger 40 thereon indicating "low", or low speed, the rotary valve element 8 will be in the position illustrated in Fig. 5, according to which the vacuum in the line 4 will be communicated through the passageway 7 and the passageway 41 of the valve element to the passageway 9 and pipe 10, which, communicated to the right hand end of the cylinder 15, will create vacuum therein. At the same time atmospheric pressure, entering the port 13 of the valve element 8, will be communicated by the passage 12 to the pipe 11, and thence to the left hand end of the cylinder 15 and will force the piston 20 towards the right thus causing the fork 27 to take the position illustrated in Fig. 2, and to hold the clutch element 30 in its low speed position.

Upon moving the lever 16 clockwise as viewed in Fig. 6, to move the finger 40 to indicate "high", or high speed, the valve element 8 will be rotated through approximately 90 degrees, clockwise as viewed in Fig. 5, to connect the passageways 7 and 12 with each other and to connect the passageway 9 with the port 13.

Thereupon vacuum from the engine will be produced in the pipe 11 as will be understood and communicated to the left hand end of the cylinder 15, Fig. 4. Correspondingly, atmosphere may enter at the port 13 and passing through the passageway 9 and pipe 10 to the right hand of the cylinder 15, force the piston 20 to the left, thus rocking the shifter fork 27 to right, as viewed in Fig. 2, and shifting the clutch element 30 to its other or high speed position.

Thus, at will, the clutch device 30 may be shifted from high to low speed and back again simply by operating the small hand lever 16 to one or the other of the positions, as described, the power to shift the gears being supplied by the vacuum in the intake side of the engine.

As is well known in the usual automotive internal combustion engine, the vacuum in the intake manifold and hence in the system embodying my invention, will be relatively high when the throttle of the engine is substantially closed or only partly open, and vice versa. Also, the shifting of transmission gears, such for example as that under consideration here, is effected more safely and efficiently if performed when the power being supplied to the engine is discontinued or at a minimum. It is one of the particular advantages of my invention that it may be adapted to cause the shifting of the gears to occur only when the engine is delivering substantially no power. In other words, if the engine is delivering power, the vacuum will be too slight to operate the gear shifting mechanism, and the operator must close the throttle or permit it to close, thus reducing the power delivered and increasing the vacuum in order to shift the gears.

In this connection it will be observed that there are at least two modes of operating the gear shifting device above described.

Either the lever 16 may be moved at a time when the engine is not delivering power; or, the lever 16 may be set at a time when the engine is delivering power and then in order to shift the gears, the operator may, in the usual operation of the vehicle, remove his foot from the accelerator whereupon the engine power will die off and the gears will shift automatically.

My invention is not limited to the exact details of construction shown and described inasmuch as many changes and modifications may be made therein without departing from the spirit of my invention or sacrificing its advantages.

Furthermore, as will be understood, the advantages of my invention may be enjoyed when applied to other mechanisms and gear shifting mechanism. Any mechanism in which an element is moved from one position to another may be effectively and efficiently operated, as for example, by means of the piston rod connected thereto.

I claim:
1. In an automotive vehicle having supporting propelling ground wheels, an internal combustion engine adapted to develop intake vacuum, a driving axle construction comprising an enclosing housing, power transmitting mechanism for transmitting power from the engine to the wheels through the axle construction comprising a multi-speed gear mechanism in the axle housing, a shift mechanism for the gear mechanism comprising a movable element in the axle housing, a shifting lever associated with the movable element extending outwardly through the axle housing and having an oscillatable bearing fulcrum on the housing, a vacuum actuable power-supplying means having a movable element connected to the shifting lever, and conduit means for communicating intake vacuum of the engine to the power-supplying means, and manually operable valve means in the line of the conduit means, the bearing fulcrum being formed in a lever housing having a generally tubular portion adapted to be telescoped into an aperture formed in the wall of the axle housing and to be detachably secured to the wall.

2. In an automotive vehicle having supporting propelling ground wheels, an internal combustion engine adapted to develop intake vacuum, a driving axle construction comprising an enclosing housing, power transmitting mechanism for transmitting power from the engine to the wheels through the axle construction comprising a multi-speed gear mechanism in the axle housing, a shift mechanism for the gear mechanism comprising a movable element in the axle housing, a shifting lever associated with the movable element extending outwardly through the axle housing and having an oscillatory bearing fulcrum on the housing, a vacuum actuable power-supplying means having a vacuum-reciprocable element connected with the shifting lever and a pair of conduit means for communicating intake vacuum of the engine to the power-supplying means to alternatively optionally reciprocate the reciprocatory element, and a manually operable valve device for optionally effecting communication of the vacuum to the conduit means, the bearing fulcrum being formed in a lever housing having a generally tubular portion adapted to be telescoped into an aperture formed in the wall of the axle housing and to be detachably secured to the wall.

3. In an automotive vehicle having supporting propelling ground wheels, an internal combustion engine adapted to develop intake vacuum, a driving axle construction comprising an enclosing walled housing, power transmitting mechanism for transmitting power from the engine to the wheels through the axle construction comprising a multi-speed gear mechanism in the axle housing, a shift mechanism for the gear mechanism comprising a movable element in the axle housing, a shifting lever associated with the movable element, the housing having an aperture in the wall thereof, a member covering the aperture, a shaft adapted to oscillate on an axis at an angle to the axis of the driving axle and supported on the said member, the shifting lever being secured to said shaft, and projecting through the perforation, means for forcing the member toward the housing, means to predeterminedly position it, a vacuum-actuable power supplying means secured to the axle housing and having a vacuum reciprocable element movable in a plane generally parallel to the axis of the driving axle, said reciprocable element being operably connected to the oscillating shaft whereby the shifting element is shifted by movement of the vacuum-reciprocable element, conduit means for communicating intake vacuum of the engine to the power-supplying means, to alternatively optionally reciprocate the reciprocatory element, and a manually operable valve device for optionally effecting communication of the vacuum to the conduit means.

4. In an automotive vehicle having supporting propelling ground wheels, an engine, a driving axle construction comprising an enclosing housing having an aperture therein, power transmitting mechanism for transmitting power from the engine to the wheels through the axle construction comprising a multi-speed gear mechanism in the axle housing, a shifting mechanism for the gear mechanism comprising a movable element in the axle housing, a shifting lever associated with the movable element extending outwardly through the aperture in the axle housing, a member positioned on the housing adjacent the aperture, the shifting lever being pivotally secured to said member, a bracket adapted to be secured to the housing adjacent the mid-portion thereof, means associated with the bracket to maintain said first named member in operative position on the housing.

5. In an automotive vehicle having supporting propelling ground wheels, an engine, a driving axle construction comprising an enclosing housing having an aperture therein, power transmitting mechanism for transmitting power from the engine to the wheels through the axle construction comprising a multi-speed gear mechanism in the axle housing, a shifting mechanism for the gear mechanism comprising a movable element in the axle housing, a shifting lever associated with the movable element extending outwardly through the aperture in the axle housing, a member positioned on the housing adjacent the aperture, said member having a conical portion extending into the aperture, the shifting lever being pivotally secured to said member, a bracket adapted to be secured to the housing adjacent the mid-portion thereof, means associated with the bracket to maintain said first named member in operative position on the housing.

6. In an automotive vehicle having supporting propelling ground wheels, an engine, a driving axle construction comprising an enclosing housing having an aperture therein, power transmitting mechanism for transmitting power from the engine to the wheels through the axle construction comprising a multi-speed gear mechanism in the axle housing, a shifting mechanism for the gear mechanism comprising a movable element in the axle housing, a shifting lever associated with the movable element extending outwardly through the aperture in the axle housing, a member positioned on the housing covering the aperture, the shifting lever being pivotally secured to said member, an abutment element on the housing adjacent the said member, adjustable means cooperating with the abutment element and said member to maintain said member in predetermined operative position on the housing.

7. In an automotive vehicle having supporting propelling ground wheels, an engine adapted to develope intake vacuum, a driving axle construction comprising an enclosing housing having an aperture therein, power transmitting mechanism for transmitting power from the engine to the wheels through the axle construction comprising a multi-speed gear mechanism in the axle housing, a shifting mechanism for the gear mechanism comprising a movable element in the axle housing, a shifting lever associated with the movable element extending outwardly through the aperture in the axle housing, a member positioned on the housing adjacent the aperture, the shifting lever being pivotally secured to said member, bracket means adapted to be secured to the housing adjacent the said member, means associated with the bracket means to maintain said first named member in operative position on the housing, and a vacuum-reciprocable member supported by the bracket means and operatively connected with the shifting lever whereby the shifting lever is actuated by movement of the vacuum-reciprocable member.

8. In an automotive vehicle having supporting propelling ground wheels, an engine, a driving axle construction comprising an enclosing housing having an aperture therein, power transmitting mechanism for transmitting power from the engine to the wheels through the axle construction comprising a multi-speed gear mechanism in the axle housing, a shifting mechanism for the gear mechanism comprising a movable element in the axle housing, a shifting lever associated with the movable element extending outwardly through the aperture in the axle housing, a member positioned on the housing adjacent the aperture, said member having a conical portion extending into the aperture, the shifting lever being pivotally secured to said member, bracket means adapted to be secured to the housing adjacent the mid-portion thereof, means associated with the bracket means to maintain the said first named member in operative position on the housing, a cylinder supported by said bracket means, and a reciprocable element associated with said cylinder and operatively connected to the shifting lever whereby the shifting lever is actuated by movement of the reciprocable element.

9. In an automotive vehicle having supporting propelling ground wheels, an engine, a driving axle construction comprising an enclosing housing having an aperture therein, power transmitting mechanism for transmitting power from the engine to the wheels through the axle construction comprising a multi-speed gear mechanism in the axle housing, a shifting mechanism for the gear mechanism comprising a movable element in the axle housing, a shifting lever associated with the movable element extending outwardly through the aperture in the axle housing, a member positioned on the housing adjacent the aperture, the shifting lever being pivotally secured to said member, an abutment element on the housing adjacent the said member, adjustable means cooperating with the abutment member to press the first named member against the housing to maintain said member in operative position on the housing.

10. In an automotive vehicle having supporting propelling ground wheels, an engine, a driving axle construction comprising an enclosing housing having an aperture therein, power transmitting mechanism for transmitting power from the engine to the wheels through the axle construction comprising a multi-speed gear mechanism in the axle housing, a shifting mechanism for the gear mechanism comprising a movable element in the axle housing, a shifting lever associated with the movable element extending outwardly through the aperture in the axle housing, a member positioned on the housing adjacent the aperture, said member having a tubular portion extending into said aperture and having an outwardly extending flange thereon disposed outwardly of the housing, a gasket positioned between said flange and the housing, and means cooperating with the bracket to press said flange against the housing and to compress the gasket between the flange and the housing whereby the aperture in the housing is sealed.

ARTHUR A. WIEDMAIER.